United States Patent [19]

Pastan et al.

[11] 4,006,416
[45] Feb. 1, 1977

[54] DIGITAL COMMUNICATION SYSTEM

[75] Inventors: Harvey L. Pastan, Chestnut Hill; Arthur H. Solomon, Winchester, both of Mass.

[73] Assignee: Arthur D. Little, Inc., Cambridge, Mass.

[22] Filed: Jan. 31, 1975

[21] Appl. No.: 545,790

[52] U.S. Cl. .............................. 325/30; 325/38 A
[51] Int. Cl.² ..................... H04L 27/10; H04L 3/00
[58] Field of Search .......... 325/30, 163, 320, 38 A; 178/67, 68, 66 R; 179/15 R; 332/16 R, 21, 25

[56] References Cited
UNITED STATES PATENTS

| | | | |
|---|---|---|---|
| 3,401,339 | 9/1968 | Kluever et al. | 178/67 X |
| 3,492,576 | 1/1970 | Warters | 178/67 X |
| 3,597,688 | 8/1971 | Ogi | 325/30 |
| 3,656,069 | 4/1972 | Beccone et al. | 325/163 X |
| 3,701,020 | 10/1972 | De Vito | 325/163 |

Primary Examiner—Benedict V. Safourek
Attorney, Agent, or Firm—Weingarten, Maxham & Schurgin

[57] ABSTRACT

A digital communication system for the transmission and reception of digitized information and capable of operation over a broad range of data rates without need for clock or timing information. The system employs as an input signal a multiple amplitude level signal having zero average amplitude which is converted to a multiple phase coded signal having zero average phase. The phase coded signal is transmitted over a communication path and upon reception is directly reconverted to a multiple amplitude level form without need for recovering clock or timing information.

7 Claims, 6 Drawing Figures

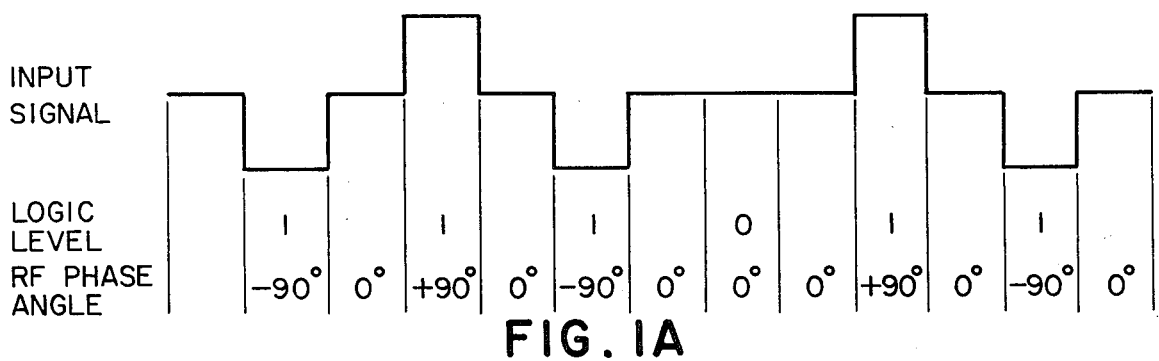
FIG. IA
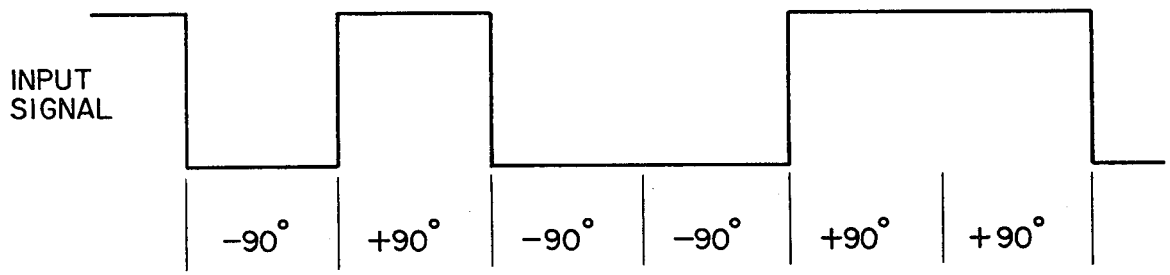
FIG. IB
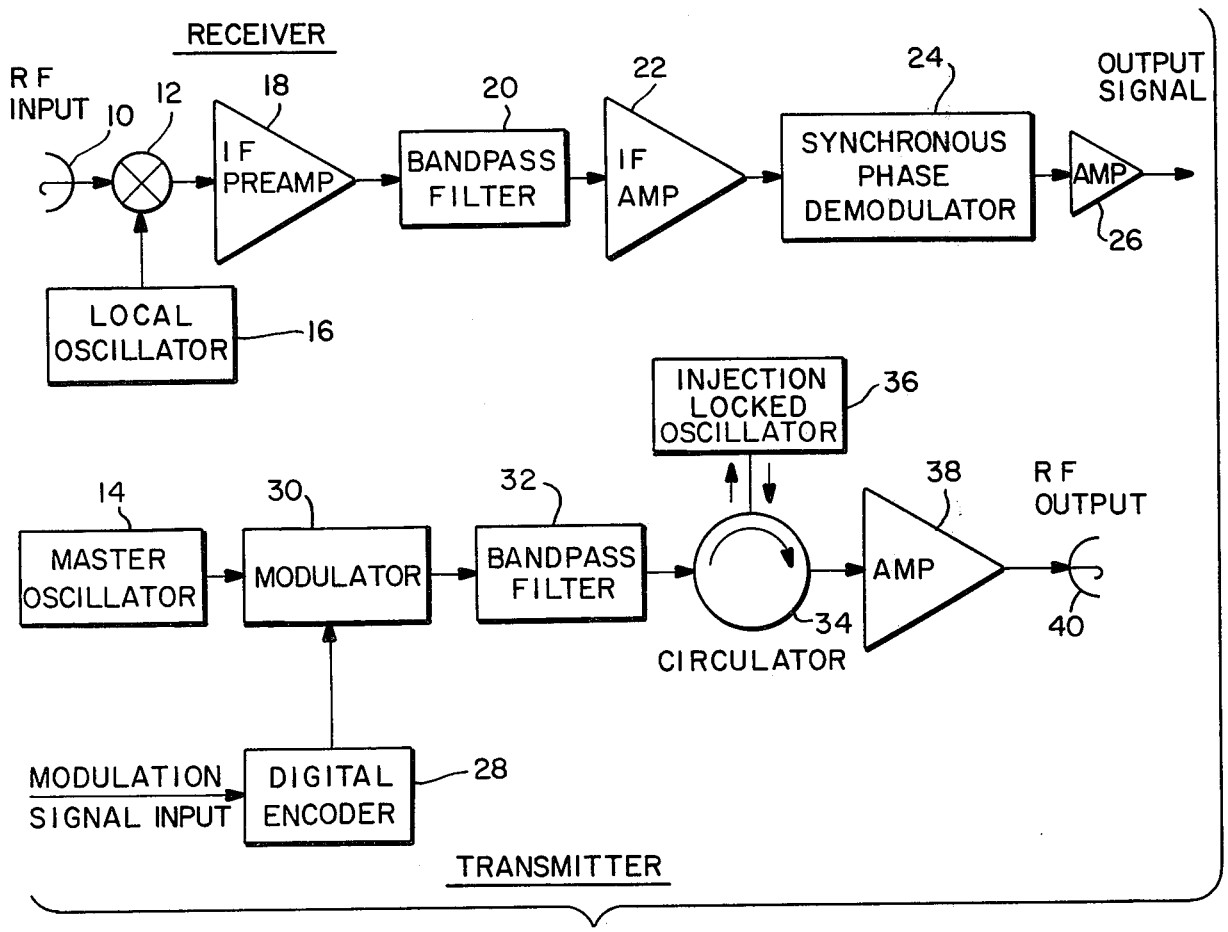
FIG. 2

DIGITAL COMMUNICATION SYSTEM

BACKGROUND OF THE INVENTION

Data communication systems are known for the conveyance of digital information over a communication path such as a microwave or cable path. Digital information is generally provided to the system at a predetermined data rate, and the system is synchronized to and operative only at the selected rate to transmit a digital signal over the communication path and to recover digital data at the receiving end. In order to provide synchronization with a particular data rate, appropriate clock or timing apparatus must be provided. In addition, synchronous encoding apparatus must often be provided to translate an input signal to a form suitable for transmission, with similar decoding apparatus provided for translating a received data signal to an intended output format. In known systems operative only at a specified clock rate, a change in the data rate would necessitate physical modification of the apparatus to be operative at the different clock rate.

SUMMARY OF THE INVENTION

In accordance with the invention, a communication system is provided for the transmission and reception of digitized information at any data rate within the bandwidth capacity of the system and without need for clock or timing information. The system is thus operative over a wide range of data rates without modification or realignment being required. The system is operative with an input modulated signal of multiple amplitude levels having zero or substantially zero average amplitude. This modulated signal is converted to a multiple phase signal having zero or substantially zero average phase which is transmitted over the communication path to a receiver which converts the phase modulated signal to the multiple amplitude level zero average amplitude signal. Modulation and demodulation are accomplished without need for a priori knowledge of the data rate and with no synchronous or slave timing or coding circuitry being required.

In a preferred embodiment, the novel system is adapted to utilize a T-carrier signal which is per se well known for telephone trunk transmission and which is a three amplitude level signal having a time average of zero amplitude. The presence of a pulse, which may be either positive or negative, represents one binary signal state, while the absence of a pulse represents the opposite binary signal state. According to the invention, the system includes a phase modulator operative to provide in response to a T-carrier or similar input signal a multiple phase signal having phase states directly corresponding to the amplitude states of the input signal. A phase synchronous demodulator is provided to reproduce the amplitude states of the input signal directly from the received phase modulated signal.

The invention can be embodied in a separate transmitter and receiver for unidirectional communication over a communication path, or alternatively can be embodied as a transceiver for bidirectional communication with the like transceiver. The invention is typically constructed for operation at a microwave frequency as microwave communication links are widely employed for data transmission and by reason of the relatively wide bandwidths available at microwave frequencies for communication at high data rates. The invention is, however, useful at other than microwave frequencies by implementation appropriate to the selected operating frequency.

DESCRIPTION OF THE DRAWINGS

The invention will be more fully understood from the following detailed description taken in conjunction with the accompanying drawings in which:

FIG. 1A is a waveform diagram of a T-carrier signal of the type that can be employed in the invention;

FIG. 1B is a waveform diagram of a further representative signal that can be employed in the invention;

FIG. 2 is a diagrammatic representation of a digital microwave transmitter and receiver according to the invention;

DETAILED DESCRIPTION OF THE INVENTION

Figure 3:
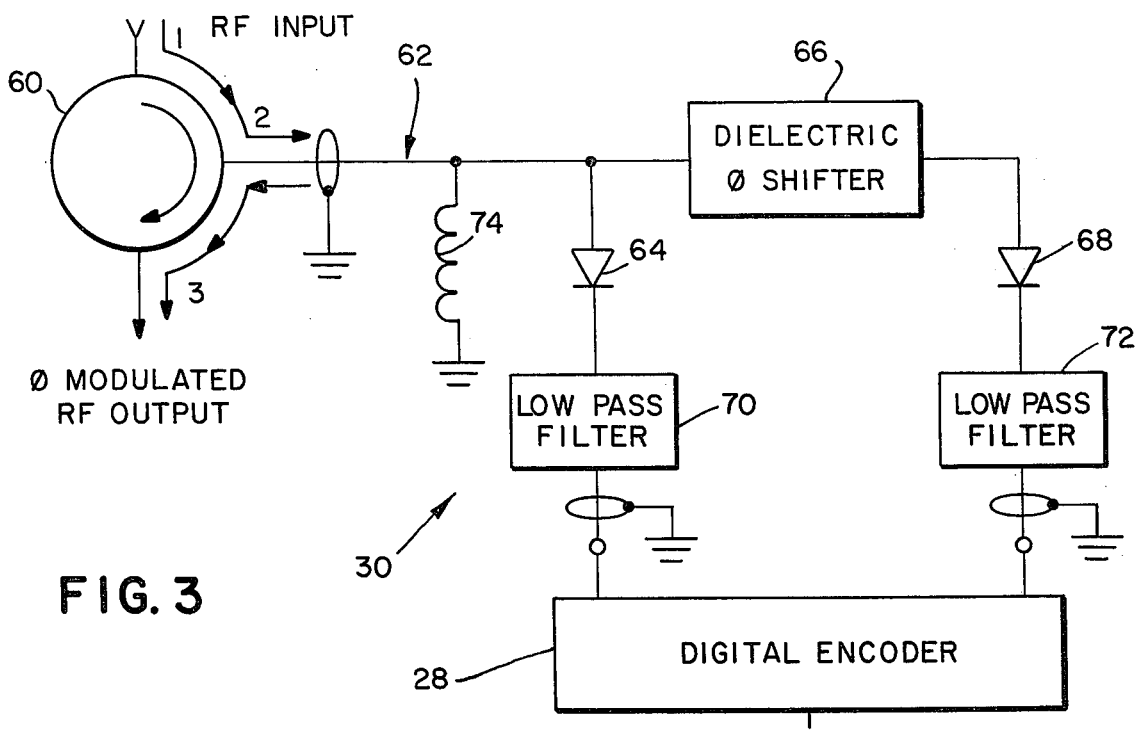
FIG. 3 is a diagrammatic representation of a three-phase modulator employed in the invention.

A signal of the type with which the invention can be employed is shown in FIG. 1A and is seen to be a bipolar signal having a 50% duty cycle. The illustrated signal format is known as a T-format or T-carrier signal and is widely employed in digital communications systems and is itself of well known signal form. The T-carrier communication format is more fully discussed in *Transmission Systems for Communication*, Fourth Edition, pp 553–565, published by Bell Telephone Laboratories, Incorporated. The signal is seen to have three levels or amplitude states, a zero level, reference level, d a positive unit amplitude level and a negative unit amplitude level. Information is coded by the presence or absence of signal pulses. Typically, the presence of a pulse, either positive or negative, represents data of one binary value, while the absence of a signal pulse represents data of opposite binary value. Signal pulses alternate in polarity such that a time average of essentially zero amplitude is maintained. According to the invention, this multilevel signal is transmitted as a phase-coded representation thereof and is directly translated back to multilevel form without need for recovering clock or timing information. The signal employed with a system according to the invention may be of other forms, such as the two level signal illustrated in FIG. 1B, or a square wave signal. The input signal need not exhibit a 50% duty cycle, and it may have any number of discrete amplitude levels, so long as a reference signal having substantially zero average phase can be derived from the resultant phase coded signal.

A digital microwave transmitting and receiving system embodying the invention is shown in FIG. 2. In the receiver of the novel system a carrier signal phase-modulated in a manner to be presently described is received by a microwave antenna 10, the output of which is coupled to a balanced mixer 12 which also receives a signal from a local oscillator 16. The output of mixer 12 is coupled to an IF preamplifier 18, the output of which, in turn, is coupled to a bandpass filter 20. The output of filter 20 is coupled to a gain controlled IF amplifier 22, the amplitude limited output of which is applied to a synchronous phase demodulator 24, which in turn provides an output signal to a video amplifier 26. The amplifier 22 is operative to clip the input signals to substantially eliminate amplitude modulation of the received signal. Ideally, the minimum detectable signal drives the amplifier 22 into saturation. The output of the video amplifier 26 is the demodulated multiple level signal to be provided to any desired utilization apparatus or system.

The transmitter portion of the system includes a digital encoder 28 which receives the multiple level input modulation signal and which provides a correspondingly coded digital control signal to a modulator 30, which also receives a carrier signal from a master oscillator 14. The phase-modulated output signal from modulator 30 is applied to a bandpass filter 32, the output of which may be applied to a circulator 34 through which it is conveyed to an injection-locked oscillator 36, such as a Gunn-effect or other suitable oscillator. The oscillator 36 functions as a limiting amplifier to provide an output signal relatively free of amplitude modulation, and locks the frequency of the output signal thereof to the frequency of the injected signal. The output of the circulator 34, which is the phase-modulated carrier signal, amplified to the power level of oscillator 36, may be further amplified by a microwave amplifier 38 and propagated by microwave antenna 40. Alternatively, the output of modulator 30 may be applied directly to antenna 40 or otherwise directly propagated over a transmission path.

It will be appreciated that the transmitting and receiving system depicted in FIG. 2 requires no timing circuitry or decoding circuitry for recovering or reproducing the data clock of the input data signal. The invention therefore is not limited to any particular clock rate, but may be utilized over a wide range of data rates within an intended system bandwidth.

A preferred embodiment of the modulator 30 useful with the invention is shown schematically in FIG. 3. This modulator is the subject of a copending application Ser. No. 545,788 in the name of Arthur H. Solomon filed of even date herewith and the disclosure of which is incorporated herein by reference. Referring to FIG. 3, there is shown a three-port circulator 60 having a first port coupled to receive the RF input signal and a second port coupled via a transmission line 62 to the anode of a first Schottky diode 64, and thence through a dielectric phase shifter 66 to the anode of a second Schottky diode 68. The cathodes of diodes 64 and 68 are coupled through respective low pass filter networks 70 and 72 to digital encoder 28 which provides biasing control signals for the respective diodes. The filters 70 and 72 provide a high frequency ground return for the phase-modulated signals and couple the direct current control signals to the diodes. A direct current return path to ground is provided by an inductor 74 coupled between the center conductor of transmission line 62 and ground. The dielectric phase shifter 66 provides a predetermined electrical separation between diodes 64 and 68 in accordance with the carrier frequency and phase coding employed. The third port of circulator 60 provides the phase modulated RF output.

The Schottky diodes function as amplitude and polarity responsive variable impedance signal reflection means for modulating the phase of the microwave carrier signal introduced by way of circulator 60. The digital encoder receives the bipolar modulator signal such as the T-carrier signal described above and provides appropriate control signals to diodes 64 and 68 according to the amplitude state of the modulating signal. The carrier signal undergoes reflection in accordance with the equivalent complex impedance and electrical separation of the diodes which determine the relative phase of the reflected wave. The reflected wave is received at the second port of circulator 60 and is conveyed to the third or output port thereof to provide the phase-modulated output signal. In the illustrated embodiment employing a T-carrier signal, a phase-modulated signal is provided having three discrete phase states directly corresponding to the three amplitude states of the input signal. With diode 64 forward biased by a control signal from encoder 28, a zero phase reference state is defined. This reference state may be defined in association with a selected biased state of diode 68. A positive phase state is provided with diode 64 reverse-biased and diode 68 forward-biased, while a negative phase state is provided with both diodes being reverse-biased. In the illustrated embodiment, the phase states are +90° and −90° corresponding to the amplitude states of the T-carrier signal as shown in FIG. 1A.

Figure 4:
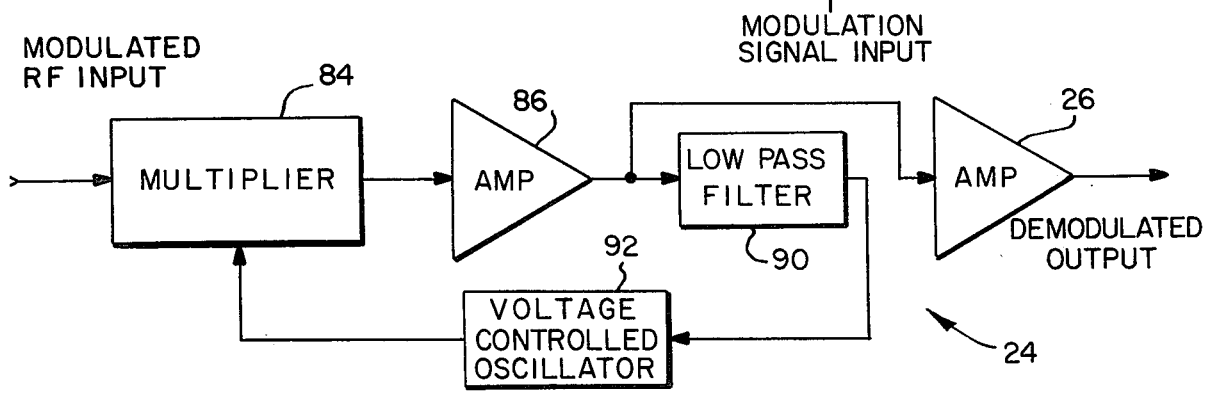
FIG. 4 is a diagrammatic representation of a phase-locked demodulator employed in the invention.

The modulator thus provides a phase-modulated output signal directly corresponding to the modulating input signal. The phase-modulated signal itself has a time average phase of zero which permits synchronous phase demodulation. A preferred embodiment of the demodulator 24 is shown in FIG. 4, and is the subject of a copending application Ser. No. 545,789 in the name of Harvey L. Pastan filed of even date herewith and the disclosure of which is incorporated herein by reference. Referring to FIG. 4, a phase-modulated signal from IF amplifier 22 (FIG. 2) is applied to a multiplier 84, the output of which is DC coupled to a low pass filter 90 and to output amplifier 26 (FIG. 2) of the receiver. The filter 90 is DC coupled to a voltage controlled oscillator (VCO) 92 which provides a reference signal to multiplier 84. This type of demodulator will be recognized to be a phase-locked loop in which the average zero phase condition of the received signal is utilized as a baseband demodulation reference.

Phase synchronous demodulation is established when the output frequency and phase of voltage-controlled oscillator 92 correspond to the zero phase state of the received signal. The phase-locked demodulator is capable of tracking the average-phase received signal over a broad range of data rates so long as the data rates are high relative to the time constant of the phase-locked loop. Consequently, no clock is required and the system is capable of operation over a broad range of data rates without modification.

The embodiment of the invention described above employs a separate transmitter and receiver for unidirectional transmission over a communication path. Alternately, the invention can be embodied in a transceiver operative with a like transceiver for bidirectional transmission over a communication path. When implemented as a transceiver, the novel system can share elements common to both the receiver and transmitter. For example, with reference to the system of FIG. 2, the oscillator 14 can provide the local oscillator signal to mixer 12 by use of a power splitter without need for a separate local oscillator in the receiver. In addition, a common antenna can be used for both transmission and reception in association with a diplexer, as is known. The invention can also be employed with well known multiplexing equipment to provide a multichannel communications link.

Figure 5:
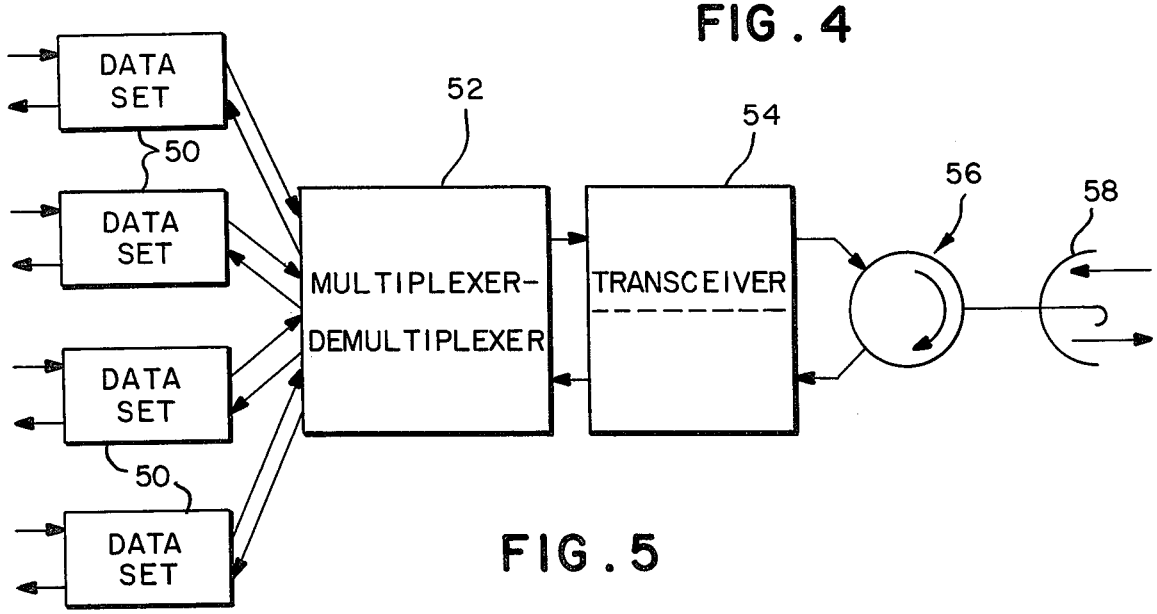
FIG. 5 is a diagrammatic representation of a multiplexed communication system employing the invention.

Such multiplexing arrangement is shown, for example, in FIG. 5 wherein a plurality of digital data sets 50 or other digital signal sources such as PCM encoders are each coupled to a multiplexer-demultiplexer 52 which is in turn coupled to a transceiver 54 embodying the present invention. The transceiver is coupled via a diplexer such as a circulator 56 to an antenna 58 employed for both transmission and reception. Each of the signal sources 50 provides a respective digital input signal to multiplexer 52 which provides a time division multiplexed modulation signal to the transmitter of transceiver 54 for transmission over a communication path in the form of a phase-coded signal such as described above. Apparatus identical to that of FIG. 5 is provided at each end of the communication path, and the phase-modulated signal is received by antenna 58 and conveyed to the receiver of transceiver 54 for demodulation and subsequent demultiplexing by demultiplexer 52 to provide respective digital output signals for application to respective utilization apparatus.

It will be appreciated that the invention is operative over a wide range of carrier frequencies, although a microwave implementation is generally preferable by reason of the relatively compact size of microwave apparatus and the relatively wide bandwidths available for microwave communication. It will also be appreciated that the invention can be employed for both wireless or wired transmission. Accordingly, the invention is not to be limited by what has been particularly shown and described, except as indicated in the appended claims.

What is claimed is:

1. A digital communication system for use with an input multiple level signal having a plurality of discrete amplitude states and a time average of substantially zero amplitude, said multiple level signal being such that the signals representative of logical ones and the signals representative of logical zeros each individually have an overall zero average amplitude so that the multiple level signal has a zero average amplitude for all data conditions, the digital communication system comprising:

means for providing a carrier signal of predetermined frequency;
means for providing said multiple level signal;
signal modulation means operative in response to said multiple level signal and said carrier signal to provide a phase-modulated output signal directly corresponding to said multiple level signal, the phase states thereof being representative of logical ones and zeros and said phase-modulated signal being such that signals representative of logical ones and signals representative of logical zeros each individually have an overall zero average phase causing the phase-modulated signal to have a zero average phase and defining a zero reference state for all data conditions;
means for transmitting said phase-modulated output signal;
means for receiving said transmitted output signal; and
demodulator means operative in response to only said received output signal and substantially independently of the data rate of said multiple level signal to directly reproduce said multiple level signal;
said demodulator means including means employing the average zero phase of said received output signal as a baseband demodulation reference.

2. A digital communication system according to claim 1 wherein said carrier signal is provided at a predetermined microwave frequency.

3. A digital communication system according to claim 2 wherein said signal modulation means includes means for selectively reflecting said microwave carrier signal to provide said phase states directly corresponding to respective amplitude states of said multiple level signal.

4. A digital communication system according to claim 1 wherein said demodulator means includes means employing the average zero phase of said received output signal representation as a baseband demodulation reference.

5. A digital communication system according to claim 1 wherein said multiple level signal providing means includes means for multiplexing a plurality of said multiple level signals for transmission over a common communication path; and
wherein said demodulator means includes means for demultiplexing said received output signal to reproduce said plurality of multiple level signals.

6. In a digital communication system employing as a modulating signal a multiple level input signal having a plurality of discrete amplitude states and a time average of substantially zero amplitude, a transmitter comprising:

means for providing a carrier signal of predetermined frequency;
means for modulating said carrier signal with said multiple level signal to provide a phase-modulated output signal having a plurality of phase states with an overall zero average phase, said phase states being representative of logical ones and zeros and said phase-modulated signals being such that signals representative of logical ones and signals representative of logical zeros each individually have an overall zero average phase;
said modulating means including a digital encoder operative only in response to said multiple level signal to provide a plurality of digital control signals corresponding to the respective amplitude states of said multiple level signal;
said modulation means being operative in response to said control signals to provide said phase-modulated output signal; and
means for transmitting said phase-modulated output signal, including:
an injection-locked oscillator; and
a circulator coupled to said injection-locked oscillator and operative to receive said phase-modulated output signal and cooperative with said injection-locked oscillator to provide a phase-modulated output signal having substantially no amplitude modulation.

7. The invention according to claim 6 wherein said modulating means further includes means operative in response to said control signals for selectively reflecting said carrier signal to provide said phase states directly corresponding to respective amplitude states of said multiple level signal.

* * * * *

UNITED STATES PATENT AND TRADEMARK OFFICE
CERTIFICATE OF CORRECTION

PATENT NO. : 4,006,416
DATED : February 1, 1977
INVENTOR(S) : Harvey L. Pastan and Arthur H. Solomon It is certified that error appears in the above-identified patent and that said Letters Patent are hereby corrected as shown below:

Column 2, lines 34-35, "a zero level, reference level,d a" should read --a zero or reference level, a Signed and Sealed this Twenty-fourth Day of May 1977

[SEAL]

Attest:

RUTH C. MASON
*Attesting Officer*

C. MARSHALL DANN
*Commissioner of Patents and Trademarks*